United States Patent
Kao et al.

(10) Patent No.: US 12,075,162 B2
(45) Date of Patent: Aug. 27, 2024

(54) CAMERA WITH PLURAL SELECTIVE FIELDS OF VIEW

(71) Applicant: Dell Products L.P., Round Rock, TX (US)

(72) Inventors: Chih-Hao Kao, New Taipei (TW); Ghee Beng Ooi, Singapore (SG); Yi-Hsien Lin, Taipei (TW)

(73) Assignee: Dell Products L.P., Round Rock, TX (US)

( * ) Notice: Subject to any disclaimer, the term of this patent is extended or adjusted under 35 U.S.C. 154(b) by 168 days.

(21) Appl. No.: 17/875,946

(22) Filed: Jul. 28, 2022

(65) Prior Publication Data

US 2024/0040258 A1    Feb. 1, 2024

(51) Int. Cl.
*H04N 23/69* (2023.01)
*H04N 5/262* (2006.01)
*H04N 23/90* (2023.01)

(52) U.S. Cl.
CPC .......... *H04N 23/69* (2023.01); *H04N 5/2624* (2013.01); *H04N 23/90* (2023.01)

(58) Field of Classification Search
CPC ....... H04N 23/69; H04N 23/90; H04N 5/2624
See application file for complete search history.

(56) References Cited

U.S. PATENT DOCUMENTS

| | | | |
|---|---|---|---|
| 8,045,042 B2 | 10/2011 | Mogi | |
| 8,325,265 B2 | 12/2012 | Chen | |
| 8,717,486 B2 | 5/2014 | Kosaka et al. | |
| 9,992,404 B2 | 6/2018 | Monkiewicz et al. | |
| 2008/0143868 A1 | 6/2008 | Tsuchiya et al. | |
| 2008/0297587 A1* | 12/2008 | Kurtz | G06V 40/20 348/E7.083 |
| 2011/0026148 A1 | 2/2011 | Tanimura et al. | |
| 2012/0250016 A1* | 10/2012 | Comstock, II | G01J 3/04 356/328 |
| 2018/0316835 A1 | 11/2018 | Files et al. | |
| 2019/0042769 A1 | 2/2019 | Sukhominov et al. | |
| 2019/0394396 A1* | 12/2019 | Fridman | H04N 23/69 |
| 2021/0041539 A1* | 2/2021 | Darrer | G01S 7/4863 |
| 2021/0200294 A1 | 7/2021 | Tam et al. | |

FOREIGN PATENT DOCUMENTS

WO    2005119330 A1    12/2005

* cited by examiner

*Primary Examiner* — Amal S Zenati
(74) *Attorney, Agent, or Firm* — ZAGORIN CAVE LLP; Robert W. Holland (57) ABSTRACT

An information handling system camera leverages telephoto optics by a moveable mirror interfaced with a first camera having a lens with a narrow field of view to capture portions of a wide field of view of a second camera lens so that the camera has improved visual images captured of participants at various distances from the camera. In one embodiment, visual images captured along first and second axes are interleaved to present a videoconference presentation streamed with visual images of both axes, such as a split screen of different videoconference participants.

18 Claims, 6 Drawing Sheets

CAMERA WITH PLURAL SELECTIVE FIELDS OF VIEW

CROSS REFERENCE TO RELATED APPLICATIONS

This application is related to U.S. patent application Ser. No. 17/875,951, filed Jul. 28, 2022, entitled "Small Form Factor Active Illumination Privacy Shutter," naming Chien-Chih Liao, Chih-Hao Kao, Ghee Beng Ooi, and Yi-Hsien Lin as inventors, which application is incorporated herein by reference.

BACKGROUND OF THE INVENTION

Field of the Invention

The present invention relates in general to the field of information handling system cameras, and more particularly to an information handling system video conference tool with mirror and lens integrated telephoto optics.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems process information with a processor and memory disposed in a housing. Desktop information handling systems typically interact with an end user through peripheral devices, such as a peripheral display, keyboard, mouse and camera. Portable information handling systems integrate processing components, a display, a keyboard, a camera and a power source in a portable housing to support mobile operations. Portable information handling systems allow end users to carry a system between meetings, during travel, and between home and office locations so that an end user has access to processing capabilities while mobile. Portable information handling systems also typically interface with peripheral devices in a similar manner to desktop systems, such as through a dock.

One important use of information handling systems is to support communication between distal end users. Often the communication is in the form of a videoconference that exchanges a video stream between information handling systems interfaced by a network. In some instances, a videoconference can include multiple participants at multiple locations. Often, enterprise conference rooms include a large display and peripheral camera so that multiple participants at the one location can join with individuals and other conference rooms to have a videoconference. One difficulty with such large videoconferences is that the camera in the conference room typically has to have a wide field of view in order to capture all of the video conference participants. Camera's with a wide field of view can show an entire room, however, the participants in the rear of the room will have a distant appearance. Generally, to have a realistic meeting vibe for a videoconference end users expect to have a closer view of a speaking participant to see the speakers facial features.

One option is to include controls at the camera that support a digital zoom of the wide field of view to offer a close view of speakers identified and located by a directional microphone or similar technique. A difficulty with this approach is that the digital zoom reduces the resolution of the visual image so that the video stream can take on a poor quality. In addition, auto framing with wide field of view (WFOV) camera can tend to distort the visual image. A second camera with a telephoto or narrow field of view can offer a higher resolution image, but is typically restricted in the amount of a conference room that can be captured.

SUMMARY OF THE INVENTION

Therefore, a need has arisen for a system and method which supports videoconferences with narrow and wide fields of view.

In accordance with the present invention, a system and method are provided which substantially reduce the disadvantages and problems associated with previous methods and systems that support videoconferences with narrow and wide fields of view. A videoconference bar having a first camera with a narrow field of view and a second camera with a wide field of view selectively directs the narrow field of view by a moveable mirror between first and second axes to capture visual images of first and second portions of the wide field of view.

More specifically, an information handling system executes a videoconference application on a processor to coordinate interactions with a videoconference bar coupled to a display that presents the videoconference. The videoconference bar includes a first camera having a narrow field of view and a second camera having a wide field of view. The wide field of view captures visual images of conference participants at a close range to the display and the narrow field of view has a telephoto capability that captures participants at a greater distance from the display using optics that offer improved image resolution. In order to direct the narrow field of view along plural axes within the wide field of view, a moveable mirror interfaces with the first camera to adjust the axis along which the narrow field of view aligns. In one embodiment, the moveable mirror interleaves camera images between two or more narrow fields of view to support simultaneous video stream from both narrow fields of view, such as a split screen view of separated field of view and a panorama view of adjacent fields of view.

The present invention provides a number of important technical advantages. One example of an important technical advantage is that a videoconference bar coupled to a display that presents a videoconference supports video stream of viewers of the display narrow and wide fields of view. The wide field of view captures an area in front of the display at a short distance while the narrow field of view provides a high resolution visual image capture of more distant participants of a video conference. A moveable mirror integrated with the narrow field of view camera provides selection of different axes within the wide field of view including simultaneous streaming of plural narrow fields of view by having the mirror cycle between two or more axes with a frequency that supports capture of visual images at each axis.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A videoconference bar provides an information handling system with wide and narrow field of view cameras having a moveable mirror to select an axis within the wide field of view for capture with a narrow field of view. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
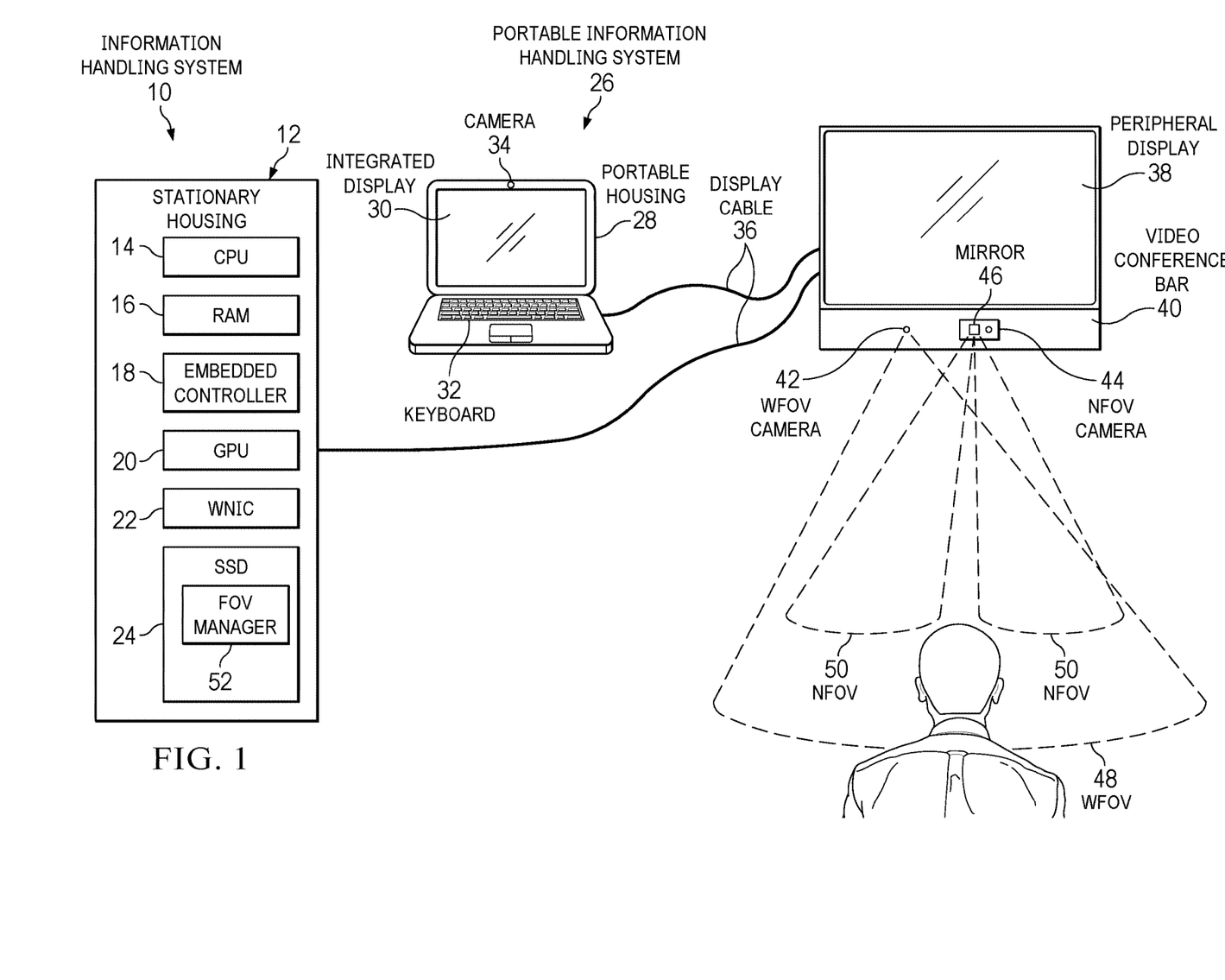
FIG. 1 depicts a videoconference bar configured to interface with an information handling system to support videoconference communication.

Referring now to FIG. 1, a videoconference bar 40 is depicted configured to interface with an information handling system 10 and/or 26 to support videoconference communication. In the example embodiment, a desktop information handling system 10 processes information with processing components disposed in a stationary housing 12. For instance, a central processing unit (CPU) 14 executes instructions to process information in cooperation with a random access memory (RAM) 16 that stores the instructions and information. An embedded controller (EC) 18 manages physical operations of the processing components, such as application of power, management of thermal constraints and interactions with peripheral devices. A graphics processing unit (GPU) 20 further processes information to define visual images for presentation at a peripheral display 38, such as with pixel values that define colors of a composite visual image. A wireless network interface controller (WNIC) 22 supports wireless communication, such as through a wireless local area network (WLAN) like WiFi or wireless personal area network (WPAN) like BLUETOOTH. A solid state drive (SSD) 24 includes flash memory having non-transitory characteristics to store an operating system and applications during power down of information handling system 10. Information handling system 10 interfaces through a display cable 36 with a peripheral display 38 to present information as visual images and receive information from display 38, such as visual images captured by cameras of a video conference bar 40 as set forth in greater detail below.

The example embodiment also includes a portable information handling system 26 having similar processing components disposed in a portable housing 28. Portable information handling system 10 includes an integrated display 30 and keyboard 32 to provide end user support when mobile. Portable information handling system 10 also supports interactions with peripheral devices, such as peripheral display 38 interfaced through a display cable 36. An integrated camera 34 of portable information handling system 10 is positioned to provide image capture of an end user in support of a videoconference.

Peripheral display 38 has a videoconference bar 40 coupled at a bottom side surface and configured to supplement videoconferencing capabilities of the information handling systems. A first camera 42 captures visual images of end users looking at displayed visual images with a wide field of view 48 that includes a wide area in front of peripheral display 38. A second camera 44 captures visual images of end users with a narrow field of view 50 that takes in a smaller area in front of peripheral display 38 but offers a telephoto zoom capability to show more distant individuals with greater resolution. For instance, the telephoto zoom capability includes a lens focusing system such as a voice coil motor (VCM) that adjusts zoom and focus at an image sensor of the camera that captures the visual image. In addition, both the wide field of view camera 42 and the narrow field of view camera 44 can perform a digital zoom by presenting a smaller area of a captured visual image with a reduced resolution. Such a digital zoom tends to detract from the videoconference by introducing lower quality images. To help avoid the use of digital zoom, a moveable mirror 46 interfaces with narrow field of view camera 44 to shift narrow field of view 50 to at least first and second axes within wide field of view 48. For instance, moveable mirror 46 is a fast steering mirror (FSM) that quickly alternates a narrow field of view (NFOV) camera axis or a microelectromechanical system (MEMS) mirror offering three dimensional movement. In the example embodiment, moveable mirror 46 provides two narrow field of views to capture visual images. The application of a field of view to capture a video conference is managed by a field of view (FOV) manager 52 running on the processor, such as based upon identification of a speaking participant by analysis of captured images and sounds of the participants.

Figure 2:
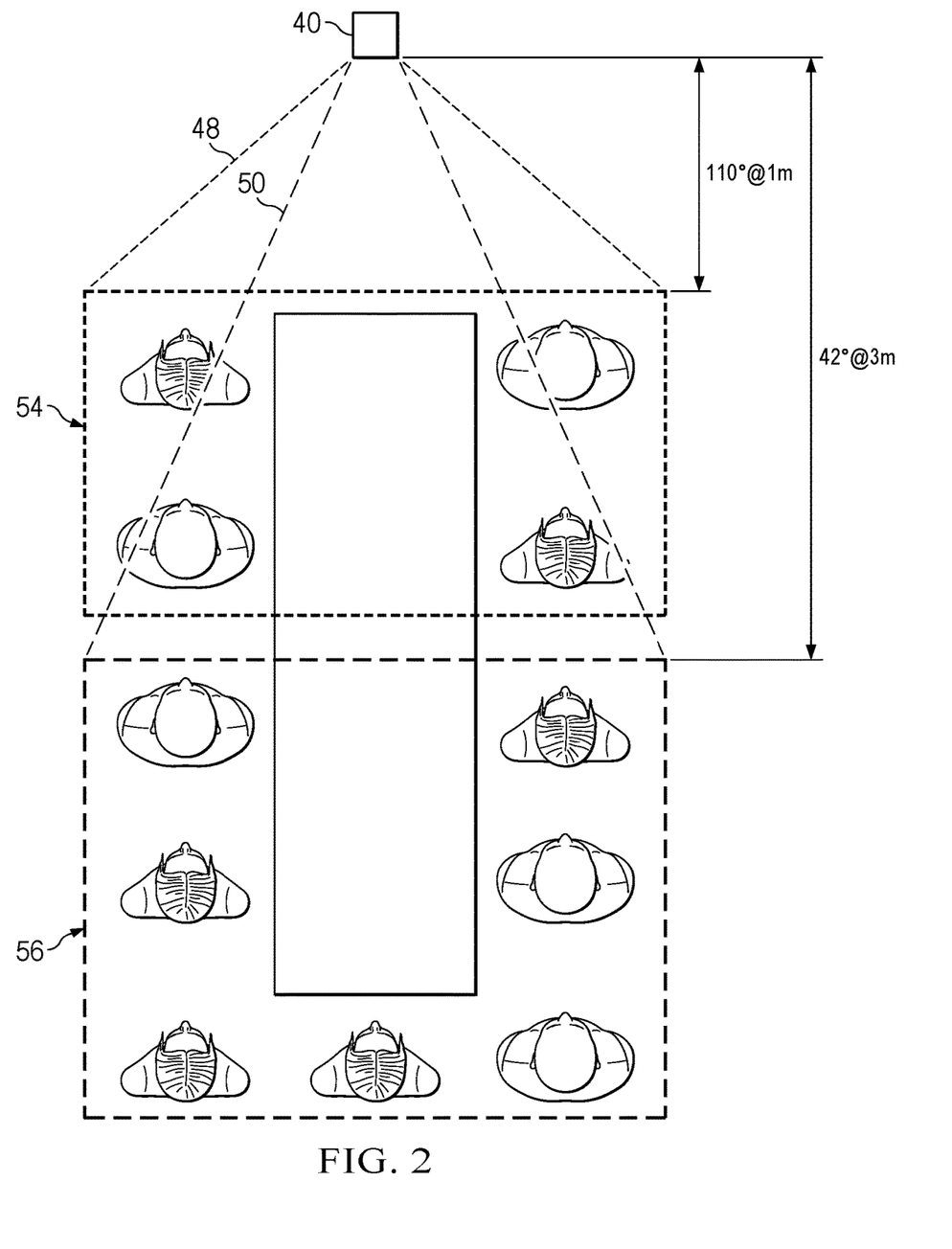
FIG. 2 depicts an example of a videoconference arrangement supported by narrow and wide field of view cameras.

Referring now to FIG. 2, an example is depicted of a videoconference arrangement supported by narrow and wide field of view cameras. In the example embodiment, video conference bar 40 provides visual coverage of a conference room with a first camera having a wide field of view 48 that shows even participants located in the front row of the conference table. A second camera with a narrow field of view has a telephoto capability to provide high resolution images of the rear participants at the conference table. In the example embodiment, the wide field of view 54 is 110 degrees to capture the front of the conference table at a one meter range. The narrow field of view 56 is 42 degrees to capture the full width of the conference table at a range of three meters. A field of view manager running on the information handling selects a camera field of view to use for the video conference based on a variety of conventional techniques, such as that identify a location of a speaker of the video conference.

Figure 3:
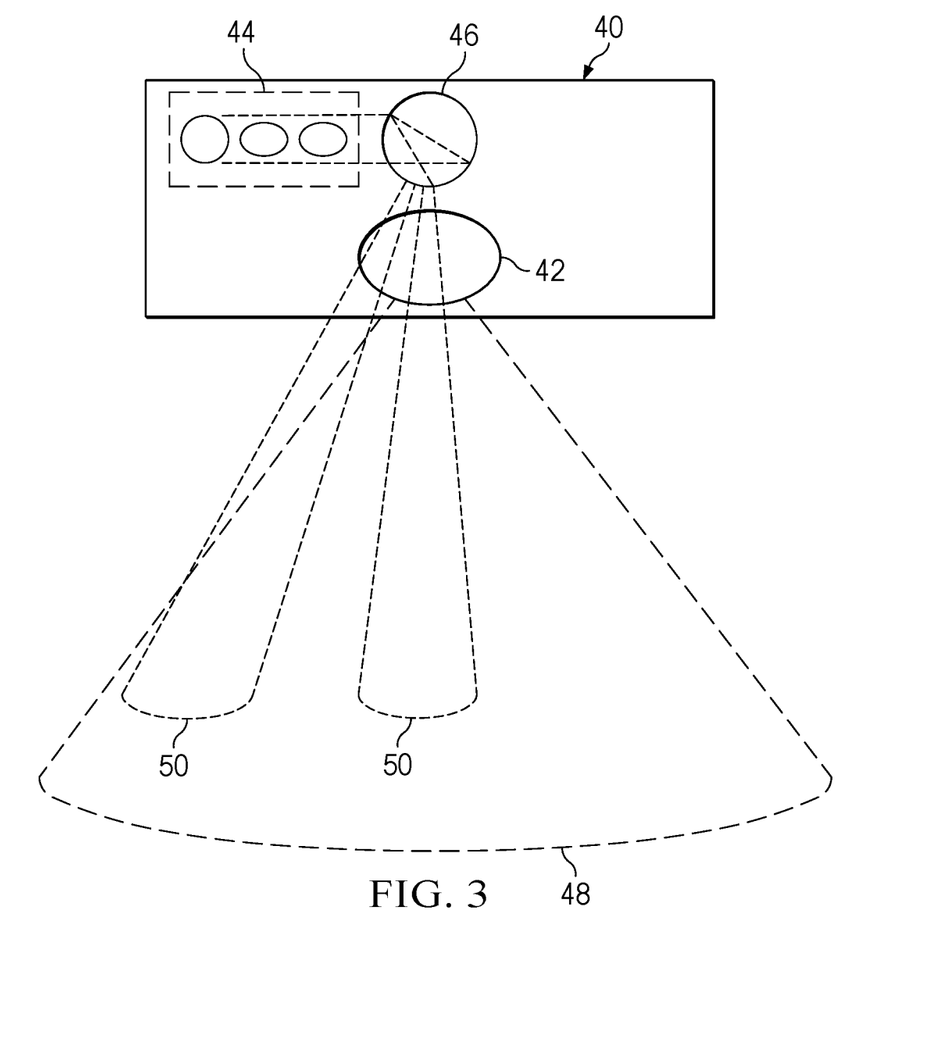
FIG. 3 depicts an example embodiment of a videoconference bar having a narrow field of view shifted within a wide field of view by a moveable mirror.

Referring now to FIG. 3, an example embodiment of a videoconference bar 40 having a narrow field of view 50 shifted within a wide field of view 48 by a moveable mirror 46. Moveable mirror 46 shifts slightly the narrow field of view (NFOV) camera axis to capture parts between wide field of view (WFOV) camera 48. In the example embodiment, moveable mirror 46 integrates in a camera 44 so that the desired axis at the front of the display is reflected into camera 44 to capture the visual image at the axis. Camera 42 captures a wide field of view 48 that includes narrow fields of view 50 and mirror 46 rotation degrees. During operation, the direction of the axis for moveable mirror 46 may be determined by visual images captured in wide field of view 48, such as that show the location of video participants.

Figure 4:
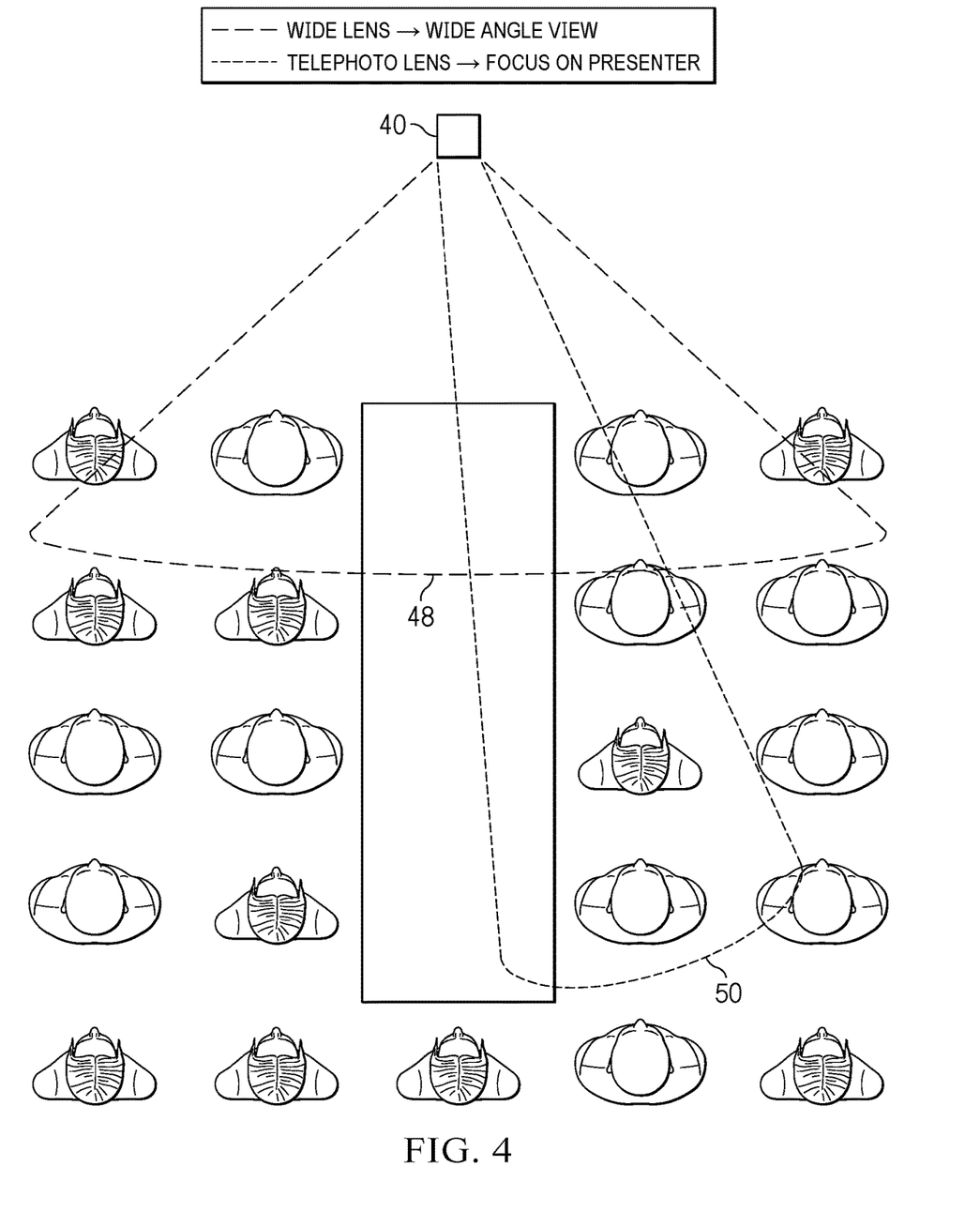
FIG. 4 depicts an example of a videoconference arrangement supported by narrow and wide field of view cameras with a narrow field of view applied to present a more distant videoconference participant.

Referring now to FIG. 4, an example is depicted of a videoconference arrangement supported by narrow and wide field of view cameras with a narrow field of view applied to present a more distant videoconference participant. In the example embodiment, videoconference bar 40 has a wide field of view 48 that captures participants at a close range and also provides a basis for directing narrow field of view at a desired participant, such as based upon analysis of the wide field of view video and/or detection of a direction of sound of a speaker. In the example embodiment, an FSM moveable mirror offers a rapid switching of narrow field of view 50 between the right side and left side of the video conference.

Figure 5:
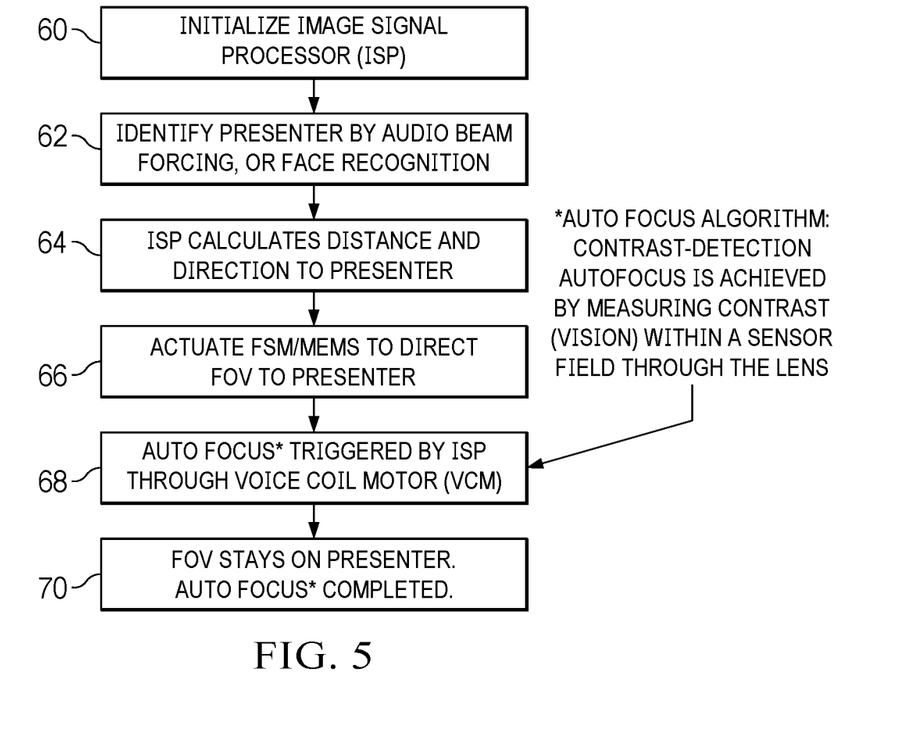
FIG. 5 depicts a flow diagram of a process for directing a narrow field of view camera at a videoconference participant.

Referring now to FIG. 5, a flow diagram of a process for directing a narrow field of view camera at a videoconference participant. The process starts at step by initializing the image signal processor of the cameras. At step 62, a presenter of the videoconference is identified by audio beam focusing, visual image recognition of a face, analysis of speaking actions or other conventional techniques. At step 64, the image signal processor calculates a distance and direction to the presenter identified at step 62, such as by applying conventional image focus techniques. At step 66, the moveable mirror is actuated to direct the narrow field of view towards the identified speaker. With a MEMS type mirror, the actuation may be supported on at least two axes to center the narrow field of view on the speaker based upon an analysis of the visual image captured by the narrow field of view camera. An FSM type mirror may have at least two angles to select so that a more precise placement of the narrow field of view could include some digital zoom logic. At step 68, an auto focus is triggered by the narrow field of view camera image signal processor, such as by a voice coil motor focus actuator. At step 70, once the auto focus is complete, the narrow field of view remains on the presenter until a different presenter becomes active.

Figure 6:
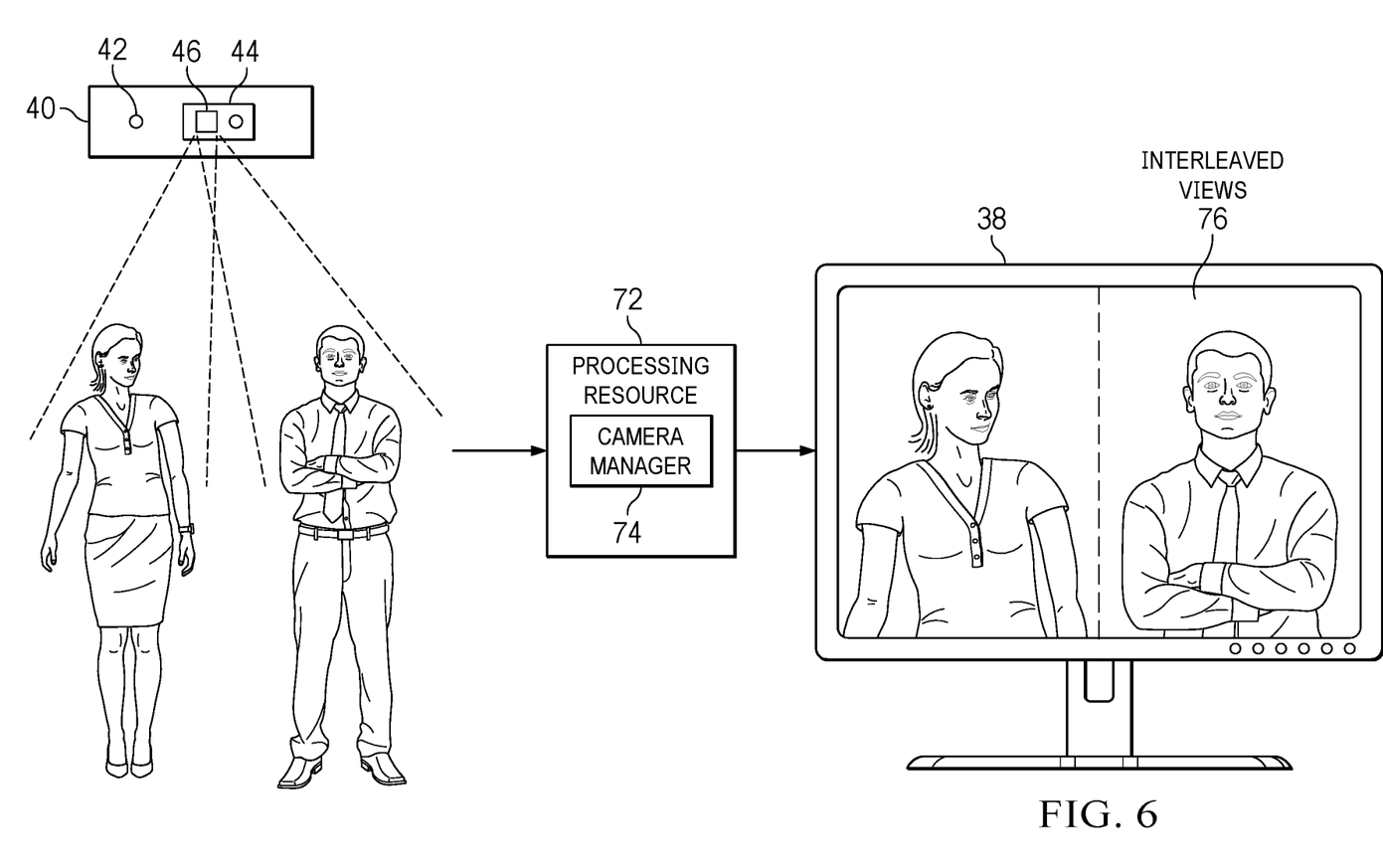
FIG. 6 depicts an example embodiment of an interleaved narrow field of views communicated as a split screen from the videoconference bar.

Referring now to FIG. 6, an example embodiment depicts interleaved narrow field of views communicated as a split screen from the videoconference bar 40. In the example embodiment, wide field of view camera 42 identifies two participants of the video conference who are having a discussion or are otherwise active in the videoconference. In response, moveable mirror 46 activates to capture interleaved visual images of each of the participants with narrow field of view camera 44 by shifting the axis of the narrow field of view between the two participants in a rapid manner, such as with a frequency of several Hertz. A camera manager 74 executes on a processing resource 72 of video conference bar 40 to manage the operation of moveable mirror 46 and narrow field of view camera 44 so that a split screen interleaved visual image 76 is presented at display 38 having the interleaved view communicated to the information handling system. For instance, in the example embodiment each half of the split screen interleaved view 76 is captured as a separated camera visual image. Moveable mirror 46 directs the field of view of camera 44 on a first axis to capture a visual image that is half of the split screen, and then shifts the field of view to a second axis to capture the other half. In one example embodiment, a MEMS of FSM mirror having a bandwidth of several KHz interleaves the capture two or more distinct fields of view with time division and stiches the different fields of view in an interlaced form, such as in a manner similar to that of a cathode ray tube monitor interlacing and refreshing pixel lines. In the example embodiment, the split screen presentation is provided where the two narrow fields of view do not overlap. In an alternative embodiment, when narrow fields of view overlap or are adjacent to each other, a stitched wide field of view may be presented, similar to a panorama view.

In operation, analysis of a wide field of view identifies two or more narrow field of views for capture by the narrow field of view camera. Each narrow field of view position is mapped to a mirror position, which can be confirmed by analysis of the narrow field of view image captured at the mirror position. When a videoconference bar output is desired with multiple fields of view, the moveable mirror establishes rotation between the fields of view at a frequency that provides a video stream from each field of view, such as 60 Hz per field of view. Thus, for instance, two fields of view interleave visual images at 120 Hz and three fields of view interleave images at 180 Hz. Each cycle has sufficient time between mirror movement to complete capture of a visual image at the field of view before the mirror initiates movement to the next field of view. The processing resource may restrict the number of fields of view and increase the time at each mirror position when needed to capture a visual image of sufficient quality, such as by using a reduced video stream cycle of 30 Hz and pausing the mirror at each field of view for a longer time period. Coordination of image capture by the processing resource helps to assure that image quality is not degraded by movement of the mirror while an image is being captured.

Although the present invention has been described in detail, it should be understood that various changes, substitutions and alterations can be made hereto without departing from the spirit and scope of the invention as defined by the appended claims.

What is claimed is:

1. An information handling system comprising:
a processor operable to execute instructions that process information;
a memory interfaced with the processor and operable to store the instructions and information;
a display interfaced with the processor and operable to present the information as visual images;
a videoconference bar coupled to the display and interfaced with the processor, the videoconference bar having a first camera with a narrow field of view and a second camera with a wide field of view, the first camera selectively directed by a moveable mirror to a first axis and to a second axis to capture visual images of first and second portions of the wide field of view;
a processing resource associated with the videoconference bar and interfaced with the moveable mirror; and
a non-transitory memory interfaced with the processing resource and storing instructions that when executed on the processing resource cause the mirror to cycle to the first axis and to the second axis and the first camera to capture interleaved visual images of the first and second portions of the wide field of view as a first video stream and a second video stream, each of the first and second portions mapped to a mirror position and captured as an optical zoom, the first and second portions of the wide field of view communicated from the videoconference bar as first and second video streams.

2. The information handling system of claim 1 wherein the display presents the interleaved visual images as a split screen having the first portion on one side of the split screen and the second portion on another side of the split screen.

3. The information handling system of claim 1 wherein the videoconference bar communicates the interleaved visual images as a split screen visual image through a video conference application executing on the processor.

4. The information handling system of claim 1 wherein the moveable mirror comprises a fast steering mirror (FSM).

5. The information handling system of claim 1 wherein the moveable mirror comprises a microelectromechanical system (MEMS) mirror.

6. The information handling system of claim 1 further comprising:
a solid state drive interfaced with the processor and having non-transitory memory; and
instructions stored in the solid state drive non-transitory memory that when executed on the processor cause selection of the visual images of the first camera or the second camera based upon a context associated with the videoconference bar.

7. The information handling system of claim 6 wherein the context comprises a distance to a videoconference participant captured in the second camera field of view.

8. The information handling system of claim 6 wherein the context comprises voice detected from one or more videoconference participants.

9. A method for capturing visual images to support a video conference with a videoconference bar having first and second cameras, the method comprising:
capturing a wide field of view with the first camera;
capturing a narrow field of view with the second camera;
selectively directing the narrow field of view to a first axis and to a second axis by a moveable mirror, the first and second axes capturing first and second portions of the wide field of view;
mapping a first mirror position to the first axis and a second mirror position to the second axis;
optically zooming the second camera at the first axis to a first person and at the second axis to a second person;
cycling the mirror between the first and second axes at the mapped positions with time division at a predetermined frequency to capture interleaved visual images of the first and second portions of the wide field of view as first and second video streams; and
communicating the first and second portions of the wide field of view from the videoconference bar as first and second video streams.

10. The method of claim 9 further comprising:
assigning the first and second portions to first and second parts of a split screen video presentation; and
communicating the split screen video presentation from the videoconference bar.

11. The method of claim 10 wherein the moveable mirror comprises a fast steering mirror (FSM).

12. The method of claim 10 wherein the moveable mirror comprises a microelectromechanical system (MEMS) mirror.

13. The method of claim 9 further comprising:
monitoring a context of the videoconference bar; and
selecting visual images of the first camera or the second camera for communication from the videoconference bar based upon the context.

14. The method of claim 13 wherein the context comprises a distance to a videoconference participant captured in the first camera field of view.

15. A videoconference bar comprising:
a first camera having a narrow field of view;
a second camera having a wide field of view;
a moveable mirror, the first camera selectively directed by the moveable mirror to a first axis and to a second axis to capture visual images of first and second portions of the wide field of view;
a processing resource associated with the videoconference bar and interfaced with the moveable mirror; and
a non-transitory memory interfaced with the processing resource and storing instructions that when executed on the processing resource cause the mirror to cycle to the first axis and to the second axis and the first camera to capture interleaved visual images of the first and second portions of the wide field of view as a first video stream and a second video stream, each of the first and second portions mapped to a mirror position and captured as an optical zoom, the first and second portions of the wide field of view communicated from the videoconference bar as first and second video streams.

16. The videoconference bar of claim 15 wherein the moveable mirror comprises a fast steering mirror (FSM).

17. The videoconference bar of claim 15 wherein the moveable mirror comprises a microelectromechanical system (MEMS) mirror.

18. The videoconference bar of claim 15 further comprising:
a processing resource interfaced with the moveable mirror; and
a non-transitory memory interfaced with the processing resource and storing instructions that when executed on the processing resource cause the mirror to cycle to the first axis and to the second axis and the first lens to capture interleaved visual images of the first and second portions of the wide field of view for communication as a video stream.

* * * * *